(12) United States Patent
Zha et al.

(10) Patent No.: US 9,100,352 B2
(45) Date of Patent: Aug. 4, 2015

(54) METHOD, DEVICE, AND SYSTEM FOR FORWARDING PACKET

(71) Applicant: Huawei Technologies Co., Ltd., Shenzhen, Guangdong (CN)

(72) Inventors: Min Zha, Shenzhen (CN); Ting Zou, Santa Clara, CA (US); Qian Zhou, Shenzhen (CN); Jing Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 247 days.

(21) Appl. No.: 13/674,924

(22) Filed: Nov. 12, 2012

(65) Prior Publication Data

US 2013/0070770 A1    Mar. 21, 2013

Related U.S. Application Data

(63) Continuation of application No. PCT/CN2011/070711, filed on Jan. 27, 2011.

(30) Foreign Application Priority Data

May 11, 2010  (CN) .......................... 2010 1 0171634

(51) Int. Cl.
*H04L 12/28* (2006.01)
*H04L 12/56* (2006.01)
(Continued)

(52) U.S. Cl.
CPC .......... *H04L 45/741* (2013.01); *H04L 12/4633* (2013.01); *H04L 12/4641* (2013.01);
(Continued)

(58) Field of Classification Search
USPC ............................................... 370/395.2, 392
See application file for complete search history.

(56) References Cited

U.S. PATENT DOCUMENTS

2006/0159100 A1 *   7/2006  Droms et al. .............. 370/395.2
(Continued)

FOREIGN PATENT DOCUMENTS

CN           1578296 A       2/2005
(Continued)

OTHER PUBLICATIONS

Office action issued in corresponding Korean application No. 10-2012-7006300,dated Jun. 27, 2013,and an English translation thereof, total 8 pages.
(Continued)

*Primary Examiner* — Andrew Lai
*Assistant Examiner* — Jamaal Henson
(74) *Attorney, Agent, or Firm* — Huawei Technologies Co., Ltd.

(57) ABSTRACT

The embodiments of the present invention provide a method, a device, and a system for forwarding a packet. The method includes: receiving an IPv6 packet sent by a gateway, and obtaining a flow label of the IPv6 packet, where the flow label of the IPv6 packet is corresponding to a link identity of customer premise equipment in one-to-one correspondence; decapsulating the IPv6 packet; performing network address translation on a decapsulated packet according to the flow label; and forwarding the decapsulated packet according to a translated network address. When multiple links between the gateway and an AFTR are corresponding to the same tunnel for network address translation, in the case that IP addresses of terminal users are overlapping or are the same, different terminal users can be distinguished, so that a terminal user that sends a packet can receive feedback, thus improving customer satisfaction.

11 Claims, 6 Drawing Sheets

(51) Int. Cl.
*H04L 12/46* (2006.01)
*H04L 12/66* (2006.01)
*H04L 29/12* (2006.01)
*H04L 12/781* (2013.01)

(52) U.S. Cl.
CPC .......... *H04L12/66* (2013.01); *H04L 29/12367* (2013.01); *H04L 29/12481* (2013.01); *H04L 29/12575* (2013.01); *H04L 29/12971* (2013.01); *H04L 61/2514* (2013.01); *H04L 61/2557* (2013.01); *H04L 61/2592* (2013.01); *H04L 61/6086* (2013.01); *H04L 45/52* (2013.01)

(56) References Cited

U.S. PATENT DOCUMENTS

| | | |
|---|---|---|
| 2006/0259608 A1 | 11/2006 | Kim et al. |
| 2010/0080230 A1* | 4/2010 | Hamamoto et al. .......... 370/392 |
| 2011/0090815 A1 | 4/2011 | Gundavelli et al. |
| 2014/0169374 A1 | 6/2014 | Gundavelli et al. |

FOREIGN PATENT DOCUMENTS

| | | |
|---|---|---|
| CN | 1716954 A | 1/2006 |
| CN | 1798093 A | 7/2006 |
| CN | 102577330 A | 7/2012 |
| EP | 1722524 A1 | 11/2006 |
| JP | 2002204252 A | 7/2002 |
| KR | 200912299 B1 | 8/2009 |

OTHER PUBLICATIONS

International search report for International application No. PCT/CN2011/070711, dated Apr. 21, 2011, 4 pages total.

F. Brockners et al.,"Gateway Initiated Dual-Stack Lite Deployment", draft-gundavelli-softwire-gateway-init-ds-lite-03, dated Sep. 9, 2010, 12 pages total.

Written opinion issued in corresponding to PCT application No. PCT/CN2011/070711,dated May 11, 2010,total 4 pages.

Search report issued in corresponding to EP application No. 11780065.6,dated Sep. 17, 2012,total 8 pages.

"Gateway Initiated Dual-Stack Lite Deployment",draft-gundavelli-softwire-gateway-init-ds-lite-01,Internet Engineering Task Force,F. Brockners,Oct. 26, 2009,total 24 pages.

"Deployment DS-lite in Point-to-Point Access Network",draft-zhou-softwire-da-lite-p2p-02,Softwires,C.Zhou,Jul. 11, 2010,total 10 pages.

Takashi Watanabe et al.,"Next-Generation Internet Protocol", Faculty of Information, Shizuoka University, Sep. 1998, total 18 pages.

"Use of Single Nat Tunnel in Combination in Consideration of Transition to IPv6", Part 2: DS-lite and A+P,Nov. 2009, total 12 pages.

F. Brockners et al, Gateway Initiated Dual-Stack Lite Deployment, draft-gundavelli-softwire-gateway-init-ds-lite-00, Internet Engineering Task Force, Oct. 13, 2009, total 21 pages.

F. Brockners et al, Gateway Initiated Dual-Stack Lite Deployment, draft-gundavelli-softwire-gateway-init-ds-lite-02, Internet Engineering Task Force,Feb. 12, 2010, total 13 pages.

C. Zhou et al, Deployment DS-lite in Point-to-Point Access Network, draft-zhou-softwire-ds-lite-p2p-00, Softwires,Jun. 1, 2010, total 9 pages.

* cited by examiner

| Key of forward NAT table | | | | Content of forward NAT table | |
|---|---|---|---|---|---|
| Tunnel ID (12 bits) | Flow Label (20 bits) | Internal network port number | Protocol type | External network IP address | External network port number |

FIG. 5

| Key of backward NAT table | | | Content of backward NAT table | | | |
|---|---|---|---|---|---|---|
| External network IP address | External network port number | Protocol type | Tunnel ID | Flow Label | Internal network port number | Internal network IP address |

METHOD, DEVICE, AND SYSTEM FOR FORWARDING PACKET

CROSS-REFERENCE TO RELATED APPLICATION

This application is a continuation of International Application No. PCT/CN2011/070711, filed on Jan. 27, 2011, which claims priority to Chinese Patent Application No. 201010171634.5, filed on May 11, 2010, both of which are hereby incorporated by reference in their entireties.

FIELD

The present invention relates to the field of network technologies, and in particular, to a method, a device, and a system for forwarding a packet.

BACKGROUND

The IPv6 (Internet Protocol Version 6, Internet Protocol Version 6) is considered as a core of the next generation Internet, which attracts attentions and gets promotion of governments and telecommunication operators of all countries.

In a process of IPv6 evolution, evolution solutions, such as dual-stack+NAT (network address translation), 6RD (IPv6 rapid deployment), and DS-LITE (dual-stack lite) mainly exist, where the DS-LITE solution is mainly directed to middle and later periods of the IPv6 evolution, that is, an IPv4 isolated island crosses over an IPv6 network to access the IPv4 Internet. For an IPv4 uplink packet, in the DS-LITE solution, a tunnel (IPv4 over IPv6) to an AFTR (Address Family Transition Router) is generally initiated on a CPE (customer premise equipment), and the tunnel is terminated in the AFTR, and IPv4 to IPv4 NAT, an uplink packet is forwarded to an IPv4 network.

A current network generally conforms to a networking manner. For example, a terminal or customer premise equipment accesses a BNG (broadband network gateway) by adopting a PPPOE (point to point protocol over Ethernet, point to point protocol over Ethernet), and the BNG performs authentication and charging on an AAA server (authentication, authorization, and accounting server) by adopting a Radius (Remote Authentication Dial In User Service, remote authentication dial in user service) protocol. In this networking manner, generally, only one or a few DS-LITE tunnels are established between one BNG and the AFTR.

In an implementation process of the present invention, the inventor finds that the prior art has at least the following problem. In the IPv6 evolution in the prior art, when multiple links between a gateway and an address family transition router AFTR are corresponding to the same tunnel for network address translation, after receiving a packet sent by the gateway, the AFTR needs to distinguish customer premise equipment according to an IP address of the customer premise equipment; if IP addresses of the customer premise equipment are overlapping or are the same, the address family transition router cannot distinguish different terminal users, so that a terminal user that sends a packet cannot receive feedback.

SUMMARY OF THE INVENTION

Embodiments of the present invention provide a method, a device, and a system for forwarding a packet. When multiple links between a gateway and an AFTR are corresponding to the same tunnel for network address translation, in the case that IP addresses of terminal users are overlapping or are the same, different terminal users can be distinguished.

In an aspect, an embodiment of the present invention provides a method for forwarding a packet, where the method includes: receiving an IPv6 packet sent by a gateway, and obtaining a flow label of the IPv6 packet, where the flow label of the IPv6 packet is corresponding to a link identity of customer premise equipment in one-to-one correspondence; decapsulating the IPv6 packet; performing network address translation on a decapsulated packet according to the flow label; and forwarding the decapsulated packet according to a translated network address.

In another aspect, an embodiment of the present invention provides a method for forwarding a packet, where the method includes: receiving an IPv4 packet sent by customer premise equipment, and obtaining a link identity of the IPv4 packet; according to the link identity of the IPv4 packet, obtaining a flow label of an IPv6 packet through a one-to-one correspondence relationship between the flow label of the IPv6 packet and a link identity of the customer premise equipment; performing tunnel encapsulation on the IPv4 packet according to the flow label of the IPv6 packet; and sending a tunnel-encapsulated packet to an address family transition router.

In another aspect, an embodiment of the present invention provides a device for forwarding a packet, where the device includes: a first packet receiving unit, configured to receive an IPv6 packet sent by a gateway, and obtain a flow label of the IPv6 packet, where the flow label of the IPv6 packet is corresponding to a link identity of customer premise equipment in one-to-one correspondence; a first decapsulation unit, configured to decapsulate the IPv6 packet; a first address translation unit, configured to perform network address translation on a decapsulated packet according to the flow label; and a first packet sending unit, configured to forward the decapsulated packet according to a translated network address.

In another aspect, an embodiment of the present invention provides a device for forwarding a packet, where the device includes: a second packet receiving unit, configured to receive an IPv4 packet sent by customer premise equipment, and obtain a link identity of the IPv4 packet; a second information obtaining unit, configured to, according to the link identity of the IPv4 packet, obtain a flow label of an IPv6 packet through a one-to-one correspondence relationship between the flow label of the IPv6 packet and a link identity of the customer premise equipment; a second encapsulation unit, configured to perform tunnel encapsulation on the IPv4 packet according to the flow label of the IPv6 packet; and a second packet sending unit, configured to send a tunnel-encapsulated packet to an address family transition router.

In another aspect, an embodiment of the present invention provides a system for forwarding a packet, where the system includes: a gateway, configured to receive an IPv4 packet sent by customer premise equipment and obtain a link identity of the IPv4 packet, according to the link identity of the IPv4 packet, obtain a flow label of an IPv6 packet through a one-to-one correspondence relationship between the flow label of the IPv6 packet and a link identity of the customer premise equipment, perform tunnel encapsulation on the IPv4 packet according to the flow label of the IPv6 packet, and send a tunnel-encapsulated packet to an address family transition router; and the address family transition router, configured to receive an IPv6 packet sent by the gateway and obtain a flow label of the IPv6 packet, where the flow label of the IPv6 packet is corresponding to the link identity of the customer premise equipment in one-to-one correspondence, decapsulate the IPv6 packet, perform network address translation on a decapsulated packet according to the flow label, and forward the decapsulated packet according to a translated network address.

The technical solutions of the present invention have the following beneficial effects. A technical means is adopted: receiving an IPv6 packet sent by a gateway and obtaining a flow label of the IPv6 packet, where the flow label of the IPv6 packet is corresponding to a link identity of customer premise equipment in one-to-one correspondence; decapsulating the IPv6 packet; performing network address translation on a decapsulated packet according to the flow label; and forwarding the decapsulated packet according to a translated network address, therefore, when multiple links between the gateway and an AFTR are corresponding to the same tunnel for network address translation, in the case that IP addresses of terminal users are overlapping or are the same, different terminal users can be distinguished, so that a terminal user that sends a packet can receive feedback, thus improving customer satisfaction.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are merely some embodiments of the present invention, and persons of ordinary skill in the art may also obtain other drawings according to these accompanying drawings without creative efforts.

DETAILED DESCRIPTION OF THE EMBODIMENTS

A specific implementation process of the present invention is described through embodiments by taking an example in the following. Apparently, the embodiments to be described are a part rather than all of the embodiments of the present invention. Based on the embodiments of the present invention, all other embodiments obtained by persons skilled in the art without creative efforts shall fall within the protection scope of the present invention.

Figure 1:
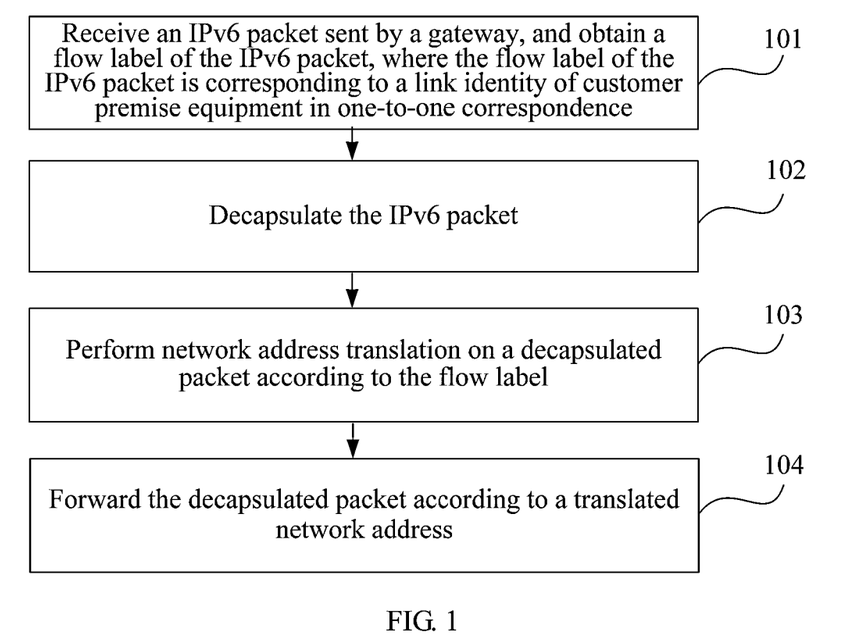
FIG. 1 is a flow chart of a method for forwarding a packet according to an embodiment of the present invention.

FIG. 1 is a flow chart of a method for forwarding a packet according to an embodiment of the present invention. The method includes:

101: Receive an IPv6 packet sent by a gateway, and obtain a flow label of the IPv6 packet, where the flow label of the IPv6 packet is corresponding to a link identity of customer premise equipment in one-to-one correspondence.

Optionally, the flow label of the IPv6 packet may include a virtual local area network (Virtual Local Area Network, VLAN) identity or a point to point protocol over Ethernet PPPOE session identity. The link identity of the customer premise equipment may include one kind of or a combination of multiple kinds of the following information: a slot number of an access device, a port number, an identity of a tunnel between the customer premise equipment and the gateway. After the IPv6 packet sent by the gateway is received, a flow label field in an IPv6 packet header may be parsed to obtain the flow label of the IPv6 packet. A value of the link identity may be the same as a value of the flow label or may be obtained by calculation according to flow label information, which is not limited in this embodiment of the present invention.

102: Decapsulate the IPv6 packet.

103: Perform network address translation on a decapsulated packet according to the flow label.

Optionally, the performing the network address translation on the decapsulated packet according to the flow label may specifically include: performing the network address translation on the decapsulated packet according to a correspondence relationship between internal network address information and external network address information, where the internal network address information may include at least one kind of or a combination of multiple kinds of the following: the flow label of the IPv6 packet, the tunnel identity, and an internal network port number, and the external network address information may include an external network address and an external network port number.

104: Forward the decapsulated packet according to a translated network address.

Optionally, the decapsulated packet may be an IPv4 packet. Optionally, the method may further include: receiving a packet sent by an external network; obtaining external network address information of the packet; performing network address translation on the packet according to a correspondence relationship between internal network address information and external network address information; performing tunnel encapsulation on the packet; and sending a tunnel-encapsulated packet to the gateway according to a translated network address.

Figure 2:
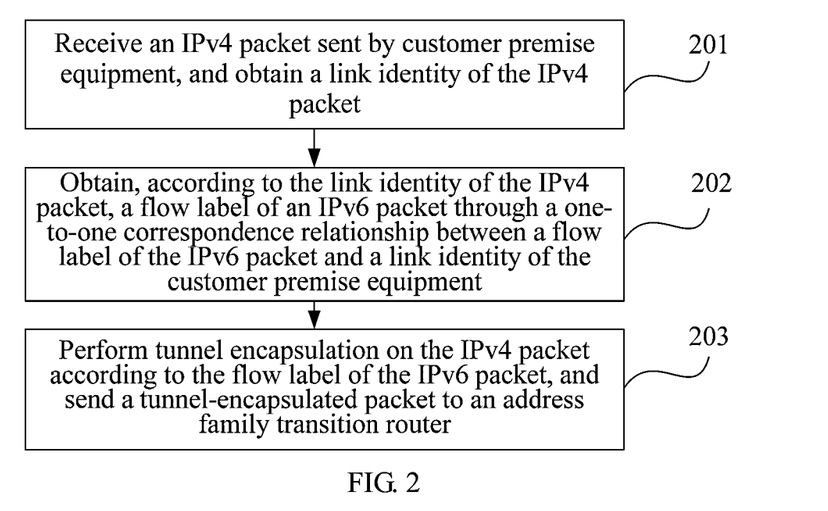
FIG. 2 is a flow chart of another method for forwarding a packet according to an embodiment of the present invention.

Corresponding to the method described in FIG. 1, FIG. 2 is a flow chart of another method for forwarding a packet according to an embodiment of the present invention. The method includes:

201: Receive an IPv4 packet sent by customer premise equipment, and obtain a link identity of the IPv4 packet.

202: According to the link identity of the IPv4 packet, obtain a flow label of an IPv6 packet through a one-to-one correspondence relationship between a flow label of the IPv6 packet and a link identity of the customer premise equipment.

203: Perform tunnel encapsulation on the IPv4 packet according to the flow label of the IPv6 packet, and send a tunnel-encapsulated packet to an address family transition router (Address Family Transition Router, AFTR).

Optionally, the method may further include: receiving an IPv6 packet sent by the address family transition router; obtaining a flow label of the IPv6 packet; performing tunnel decapsulation on the IPv6 packet to obtain an IPv4 packet;

according to the flow label, obtaining a link identity of the customer premise equipment through the one-to-one correspondence relationship between the flow label of the IPv6 packet and the link identity of the customer premise equipment; and forwarding the IPv4 packet according to the link identity of the customer premise equipment.

In the preceding method embodiment of the present invention, when multiple links between the gateway and the AFTR are corresponding to the same tunnel for network address translation, in the case that IP addresses of terminal users are overlapping or are the same, different terminal users can be distinguished, so that a terminal user that sends a packet can receive feedback, thus improving customer satisfaction.

Figure 3:
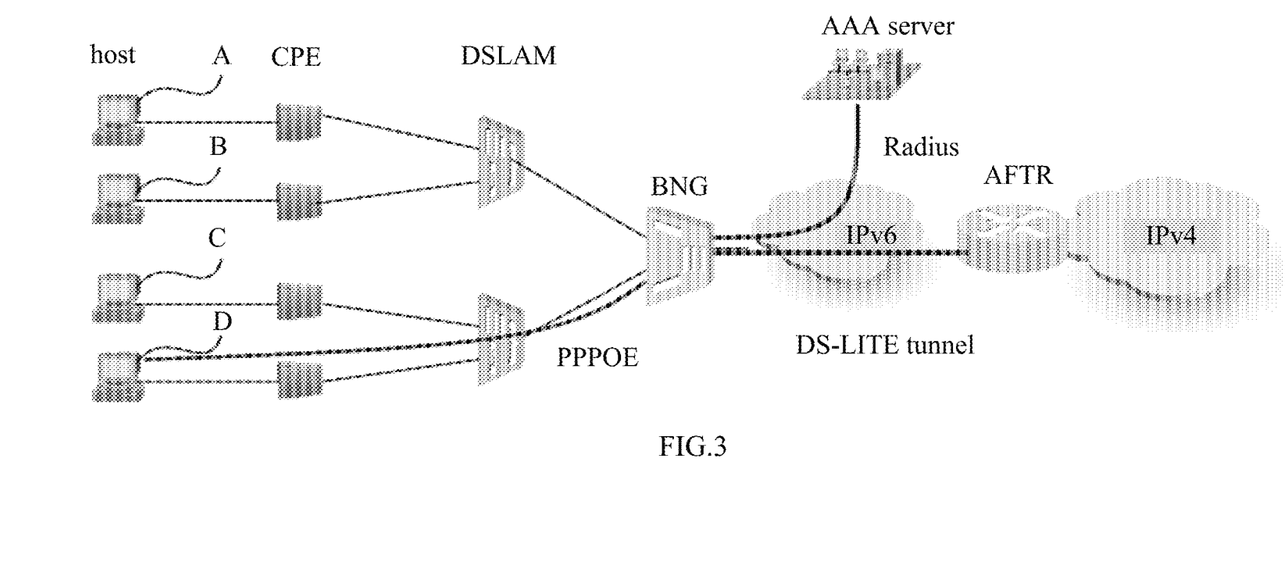
FIG. 3 is a schematic diagram of a network layout that is applied to a dual-stack lite DS-LITE solution according to an embodiment of the present invention.

FIG. 3 is a schematic diagram of a network layout that is applied to a dual-stack lite DS-LITE solution according to an embodiment of the present invention.

In FIG. 3, customer premise equipment is used in a general sense, and the customer premise equipment may include a host or a terminal and a CPE. In this embodiment, each of hosts HostsA, B, C, and D and each CPE may be customer premise equipment. For an access device, a digital subscriber line access multiplexer DSLAM device is taken as an example and for a gateway, a broadband network gateway BNG is taken as an example to describe the following application scenario.

Connection relationships between each device in FIG. 3 are as follows. Four hosts are HostA, HostB, HostC, and HostD respectively, where the hosts are connected to four pieces of customer premise equipment CPE respectively. Each CPE accesses a broadband network gateway BNG through a digital subscriber line access multiplexer DSLAM in a PPPOE manner. The BNG performs authentication and charging on an authentication, authorization, and accounting server AAA server by using a remote authentication dial in user service Radius protocol. The customer premise equipment is located in an IPv4 private network, the BNG and an AFTR are in an IPv6 network, a network on the right of the AFTR is an IPv4 public network, and IP addresses of the HostA and the HostD may be overlapping or may be the same.

Network address translation in this embodiment of the present invention is described in detail in the following with reference to FIG. 3.

In an uplink direction:

The HostD sends an IPv4 packet to the BNG through the CPE and the DSLAM. The BNG receives the IPv4 packet sent by the HostD and obtains a link identity of the IPv4 packet. Here, an obtained link identity may be a session identity Session ID (generally, the Host D dials by using a PPPOE link, and the BNG allocates a unique session identity Session ID of the PPPOE link of the customer premise equipment to the PPPOE link, where the session identity has 16 bits). The BNG obtains, according to a Session ID of the IPv4 packet, a flow label Flow Label of an IPv6 packet through a one-to-one correspondence relationship between the flow label Flow Label of the IPv6 packet and a Session ID of the customer premise equipment (if the BNG receives the IPv4 packet for the first time, the correspondence relationship may have not been saved. At this time, the correspondence relationship needs to be established and saved after successful establishment, so that after receiving an uplink IPv4 packet next time, the BNG performs a subsequent operation according to a saved correspondence relationship. The correspondence relationship may be established by manually setting or may be automatically established and saved when a system is started, which is not limited in this embodiment of the present invention). The BNG performs tunnel encapsulation (that is, an IPv6 packet header is added before the IPv4 packet, where the IPv6 packet header includes a Flow Label field of the IPv6, and the BNG fills the Flow Label field corresponding to the IPv6 packet header with a value of the obtained Flow Label of the IPv6 packet) on the IPv4 packet according to the flow label Flow Label of the IPv6 packet, and sends a tunnel-encapsulated packet to an AFTR.

The AFTR receives the IPv6 packet sent by the BNG (in a process of the AFTR receiving the IPv6 packet sent by the BNG, a forward NAT table in FIG. 5 and a backward NAT table in FIG. 6 may be generated at the same time, where content of the tables is described in detail in the following), and obtains a value of the flow label Flow Label of the IPv6 packet, where the value of the flow label Flow Label of the IPv6 packet is corresponding to a link identity of the customer premise equipment in one-to-one correspondence. The AFTR decapsulates the IPv6 packet (that is, removes the IPv6 packet header to obtain the IPv4 packet). According to the flow label Flow Label, network address translation is performed on a decapsulated IPv4 packet by using the forward NAT table in FIG. 5 (according to a correspondence relationship between saved internal network address information (that is, a key of the forward NAT table in FIG. 5) and external network address information (that is content of the forward NAT table in FIG. 5, including an external network IP address and an external network port number)). The decapsulated IPv4 packet is forwarded to a corresponding IPv4 public network according to a translated network address (that is, internal network address information of the IPv4 packet is translated into external network address information).

It should be noted that, the BNG has different access manners, such as PPPOE and VLAN. For a received packet, the BNG allocates, according to an access link of the received packet, a link identity of a link where the customer premise equipment is located. It is assumed that a value of the link identity is the same as that of the flow label, a uniquely corresponding Flow Label value on the BNG may be allocated to the link identity according to a certain rule. For example, for PPPOE link access, a value of the Flow Label may be a PPPOE SESSION ID; and for VLAN access, a value of the Flow Label may be a VLAN ID. The BNG may also allocate a value of the Flow Label in a unified way to ensure uniqueness of the Flow Label and convenience of packet forwarding. The link identity of the customer premise equipment includes one kind or multiple kinds of the following: a slot number of an access device, a port number, an identity of a tunnel between the customer premise equipment and the gateway.

Figure 5:
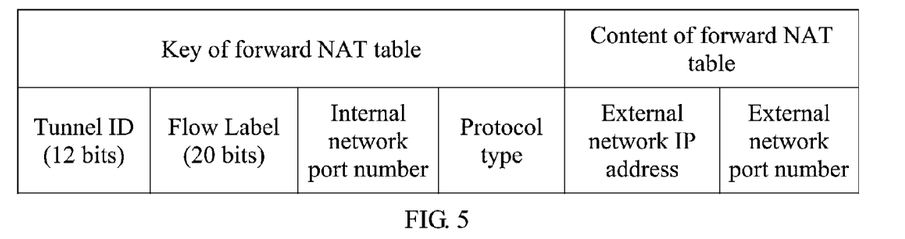
FIG. 5 is a schematic diagram of a forward NAT table according to an embodiment of the present invention.
Figure 6:
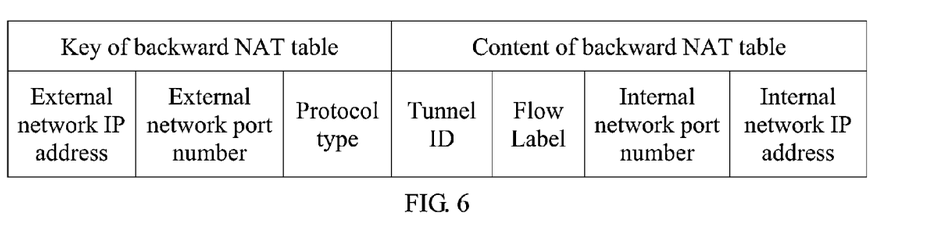
FIG. 6 is a schematic diagram of a backward NAT table according to an embodiment of the present invention.

In a process of the AFTR obtaining the IPv6 packet, specific processes for generating the forward NAT table in FIG. 5 and the backward NAT table in FIG. 6 are as follows.

Generation of the table in FIG. 5: The AFTR receives an IPv6 packet sent by the BNG; obtains a value of the flow label Flow Label of the IPv6 packet; fills each option of internal network address information (that is, the key of the forward NAT table) with the value respectively according to the flow label Flow Label, a tunnel identity ID (the tunnel identity is a tunnel identity between the gateway and the AFTR), an internal network port number (an IPv6 internal network port number), and a protocol type (an IPv6 private network protocol type); and obtains external network address information (that is, content of the forward NAT table) according to a correspondence relationship between internal network address information and external network address information, where the external network address information includes an external network IP address and an external network port number.

Generation of the table in FIG. 6: Fill an option corresponding to a key of the backward NAT table with a value of each item respectively according to the external network port number, the external network IP address, and the IPv6 public network protocol type that are generated in the table in FIG. 5; obtain content of the backward NAT table according to a correspondence relationship between a key of the backward NAT table and content of the backward NAT table, that is, obtain internal network address information and an internal network IP address according to external network address information and an external network protocol type.

In a downlink direction:

The AFTR receives an IPv4 packet sent by an external network (that is, the IPv4 public network) to obtain external network address information and an IPv4 public network protocol type that are included in the IPv4 packet, then the AFTR performs network address translation on the IPv4 packet according to a correspondence relationship between a key of the backward NAT table and content of the backward NAT table (that is, a correspondence relationship between internal network address information and external network address information), and then performs tunnel encapsulation (that is, an IPv6 packet header is added before the IPv4 packet, where the IPv6 packet header includes a flow label of an IPv6 packet, and the flow label is a value of the flow label) on the IPv4 packet to obtain a tunnel-encapsulated packet, that is, an IPv6 packet, and sends the packet to the BNG. The BNG receives the IPv6 packet sent by the AFTR to obtain a value of the flow label Flow Label of the IPv6 packet, performs tunnel decapsulation on the IPv6 packet to obtain the IPv4 packet (removes the IPv6 packet header to obtain the IPv4 packet), then obtains a Session ID of the customer premise equipment according to a one-to-one correspondence relationship between the Flow Label and a link identity Session ID of the customer premise equipment, and forwards the IPv4 packet to a corresponding HostD according to the Session ID.

In the preceding method embodiment of the present invention, when multiple links between the BNG and the AFTR are corresponding to the same tunnel for network address translation, in the case that IP addresses of the HostA and the HostD may be overlapping or may be the same, different terminal users can be distinguished, so that a terminal user HostD that sends a packet can receive feedback, thus improving customer satisfaction.

Figure 4:
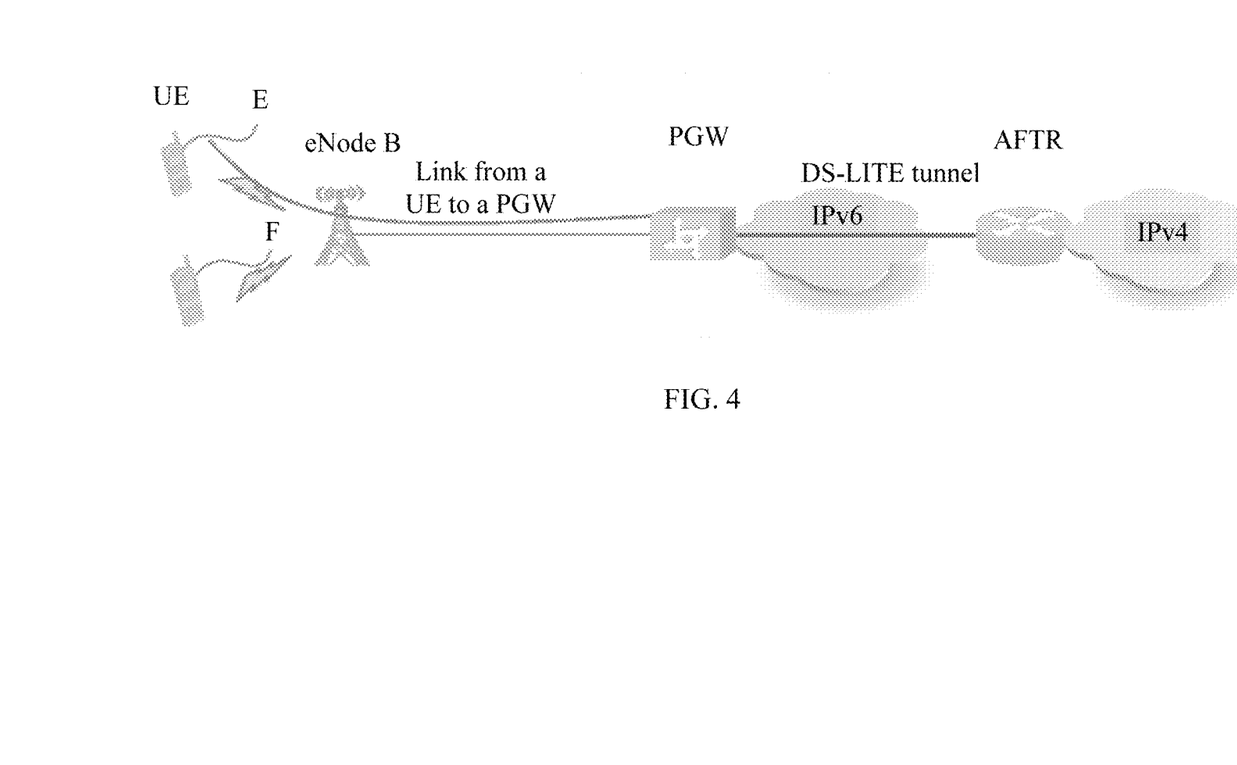
FIG. 4 is a schematic diagram of a network layout that is applied to another dual-stack lite DS-LITE solution according to an embodiment of the present invention.

The preceding method is also applicable to a wireless scenario, as shown in FIG. 4. FIG. 4 is a schematic diagram of a network layout that is applied to another dual-stack lite DS-LITE solution according to an embodiment of the present invention. In FIG. 4, a user terminal UE E dials by using a link via an eNode B (Evolved Node B, evolved Node B, which is a mobile base station in a 3G network). A PGW (Public Data Network gateway, public data network gateway) allocates a unique link identity TEID (PGW tunnel identity, TEID) to the link. The PGW sets a correspondence relationship between the TEID and a flow label Flow Label of a tunnel in a DS-LITE, so that the TEID is corresponding to the Flow Label in one-to-one correspondence (a link identity of the customer premise equipment, that is, a link layer identity, further includes an identity of a tunnel from the customer premise equipment to a GATEWAY). An AFTR treats the Flow Label as a part of the NAT table to translate, which is also applicable to a situation that IP addresses of user terminals may be overlapping or may be the same.

A procedure for forwarding an IPv4 packet in FIG. 4 is basically the same as that in the embodiment in FIG. 3, therefore, this embodiment of the present invention is simply described here with reference to FIG. 4.

In an uplink direction:

The PGW receives an uplink IPv4 packet sent by the UE E, obtains link identity information TEID in the uplink IPv4 packet, then performs tunnel encapsulation (that is, an IPv6 packet header is added before the IPv4 packet, where the IPv6 packet header includes a Flow Label field of the IPv6, and the BNG fills the Flow Label field corresponding to the IPv6 packet header with a value of an obtained Flow Label of an IPv6 packet) on the uplink IPv4 packet according to a one-to-one correspondence relationship between the TEID and a Flow Label of the IPv6 packet, and sends a generated IPv6 packet to the AFTR.

The AFTR receives an IPv6 packet sent by the PGW, obtains flow label information Flow Label of the IPv6 packet in the IPv6 packet according to the link identity information TEID. The AFTR decapsulates the IPv6 packet to obtain an IPv4 packet, performs network address translation on the IPv4 packet according to a correspondence relationship (that is, a correspondence relationship between internal network address information and external network information) of a forward NAT table in FIG. 5, and forwards the IPv4 packet to a corresponding IPv4 public network according to a translated network address.

For a procedure in a downlink direction, reference may be made to the process in the downlink direction described in the embodiment in FIG. 3, and which are not described in detail here again.

In the preceding technical solutions of the method embodiments of the present invention, when only one tunnel between the gateway and the AFTR exists, and network address translation is performed, in the case that IP addresses of terminal users are overlapping or are the same, different terminal users can be distinguished according to the flow label information of the IPv6 packet. A link ID maps a Flow Label, so that an NAT is irrelevant to a user source IP, which may support a situation that IP addresses of terminal users are overlapping or are the same. In addition, 20 bits of a Flow Label and 12 bits of a tunnel ID are used as an index and may form a 32-bit index (key). In this way, original NAT implementation (mainly including a size and an index length) is not changed and the original NAT implementation is more compatible.

Figure 7:
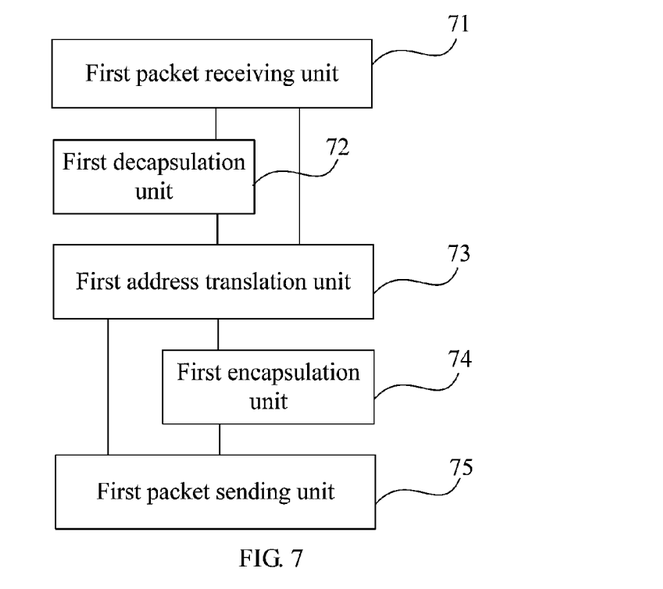
FIG. 7 is a schematic structural diagram of a device for forwarding a packet according to an embodiment of the present invention.

Corresponding to the preceding method embodiments, FIG. 7 is a schematic structural diagram of a device for forwarding a packet according to an embodiment of the present invention. The device includes:

a first packet receiving unit 71, configured to receive an IPv6 packet sent by a gateway, and obtain a flow label of the IPv6 packet, where the flow label of the IPv6 packet is corresponding to a link identity of customer premise equipment in one-to-one correspondence;

a first decapsulation unit 72, configured to decapsulate the IPv6 packet;

a first address translation unit 73, configured to perform network address translation on a decapsulated packet according to the flow label; and a first packet sending unit 75, configured to forward the decapsulated packet according to a translated network address.

Optionally, the first address translation unit 73 is specifically configured to perform network address translation on the decapsulated packet according to a correspondence relationship between internal network address information and external network address information, where the internal network address information includes at least one kind of or a combination of multiple kinds of the following: the flow label of the IPv6 packet, a tunnel identity, and an internal network port number, and the external network address information includes an external network address and an external network port number.

Optionally, the device may further include: the first packet receiving unit 71, further configured to receive a packet sent by an external network and obtain external network address information of the packet; the first address translation unit 73, further configured to perform network address translation on the packet according to a correspondence relationship between internal network address information and external network address information; a first encapsulation unit 74, configured to perform tunnel encapsulation on the packet; and the first packet sending unit 75, further configured to send a tunnel-encapsulated packet to the gateway according to a translated network address.

Optionally, the flow label of the IPv6 packet may include a virtual local area network VLAN identity or a point to point protocol over Ethernet PPPOE session identity. The link identity of the customer premise equipment includes one kind of or a combination of multiple kinds of the following information: a slot number of an access device, a port number, an identity of a tunnel between the customer premise equipment and the gateway.

Figure 8:
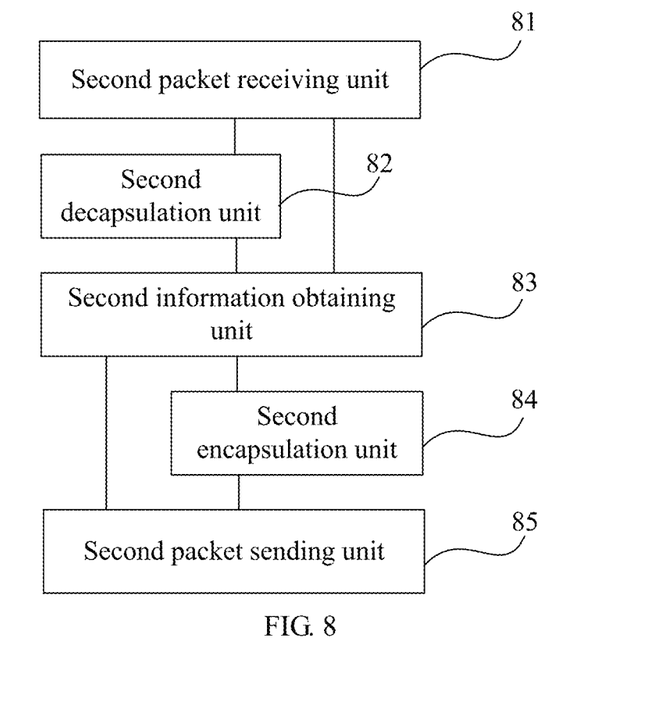
FIG. 8 is a schematic structural diagram of another device for forwarding a packet according to an embodiment of the present invention.

Corresponding to the preceding device, FIG. 8 is a schematic structural diagram of another device for forwarding a packet according to an embodiment of the present invention. The device includes:

a second packet receiving unit 81, configured to receive an IPv4 packet sent by customer premise equipment, and obtain a link identity of the IPv4 packet;

a second information obtaining unit 83, configured to obtain, according to the link identity of the IPv4 packet, a flow label of an IPv6 packet through a one-to-one correspondence relationship between the flow label of the IPv6 packet and a link identity of the customer premise equipment;

a second encapsulation unit 84, configured to perform tunnel encapsulation on the IPv4 packet according to the flow label of the IPv6 packet; and a second packet sending unit 85, configured to send a tunnel-encapsulated packet to an address family transition router.

Optionally, the device may further include: the second packet receiving unit 81, further configured to receive an IPv6 packet sent by the address family transition router and obtain a flow label of the IPv6 packet; a second decapsulation unit 82, configured to perform tunnel decapsulation on the IPv6 packet to obtain an IPv4 packet; the second information obtaining unit 83, further configured to obtain, according to the flow label, a link identity of the customer premise equipment through the one-to-one correspondence relationship between the flow label of the IPv6 packet and the link identity of the customer premise equipment; and the second packet sending unit 85, further configured to forward the IPv4 packet according to the link identity of the customer premise equipment.

Figure 9:
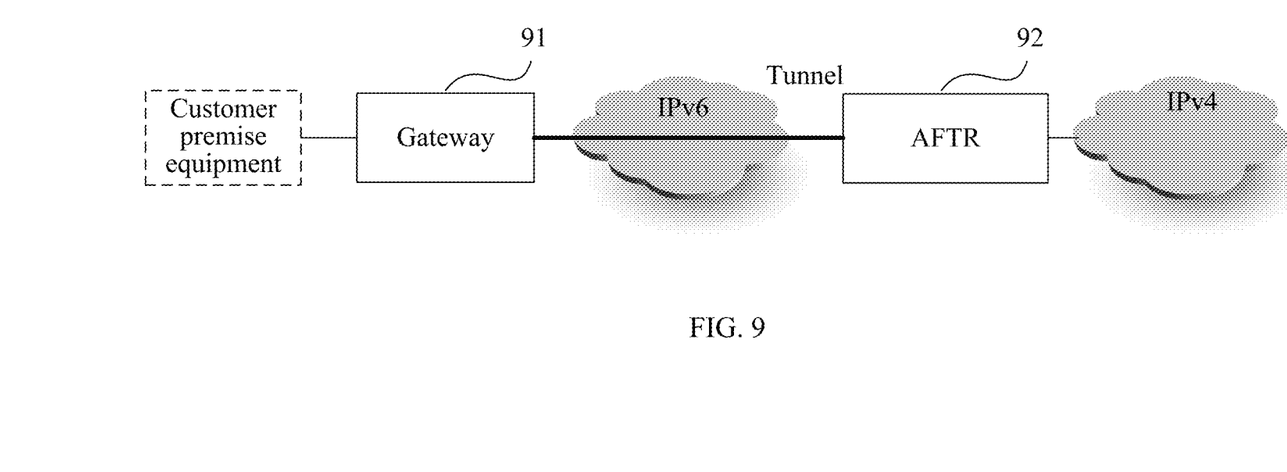
FIG. 9 is a schematic diagram of a system for forwarding a packet according to an embodiment of the present invention.

Corresponding to the preceding device, FIG. 9 is a schematic diagram of a system for forwarding a packet according to an embodiment of the present invention. The system includes:

a gateway 91, configured to receive an IPv4 packet sent by customer premise equipment and obtain a link identity of the IPv4 packet, obtain, according to the link identity of the IPv4 packet, a flow label of an IPv6 packet through a one-to-one correspondence relationship between the flow label of the IPv6 packet and a link identity of the customer premise equipment, perform tunnel encapsulation on the IPv4 packet according to the flow label of the IPv6 packet, and send a tunnel-encapsulated packet to an address family transition router AFTR; and an address family transition router AFTR 92, configured to receive an IPv6 packet sent by the gateway and obtain a flow label of the IPv6 packet, where the flow label of the IPv6 packet is corresponding to the link identity of the customer premise equipment in one-to-one correspondence, decapsulate the IPv6 packet, perform network address translation on a decapsulated packet according to the flow label, and forward the decapsulated packet according to a translated network address.

In the preceding device or system embodiment of the present invention, when multiple links between the gateway and the AFTR are corresponding to the same tunnel for network address translation, in the case that IP addresses of terminal users are overlapping or are the same, different terminal users can be distinguished, so that a terminal user that sends a packet can receive feedback, thus improving customer satisfaction. A link ID maps a Flow Label, so that an NAT is irrelevant to a user source IP, which may support a situation that IP addresses of terminal users are overlapping or are the same. In addition, 20 bits of a Flow Label and 12 bits of a tunnel ID are used as an index and form a 32-bit index (key). In this way, original NAT implementation (mainly including a size and an index length) is not changed and the original NAT implementation is more compatible.

Through the preceding description of an implementation manner, persons skilled in the art that may clearly understand that the present invention may be accomplished through software plus a necessary universal hardware platform, and definitely may also be implemented all through hardware. But in many cases, the former is a preferred implementation manner. Based on this understanding, all or a part of the technical solutions of the present invention that make contributions to the prior art may be embodied in the form of a software product. The software product may be used to execute the procedure of the preceding method. The computer software product may be stored in a storage medium, such as an ROM/ RAM, a magnetic disk, or an optical disk, and includes several instructions to instruct a piece of computer equipment (for example, a personal computer, a server, or network equipment) to perform the methods described in each embodiment or in some parts of the embodiments of the present invention.

The preceding descriptions are only specific exemplary embodiments of the present invention, but are not intended to limit the protection scope of the present invention. Variations or replacements that may be easily thought of by persons skilled in the art without departing from the technical scope disclosed by the present invention shall all fall within the protection scope of the present invention. Therefore, the protection scope of the present invention shall be subject to the protection scope of the appended claims.

We claim:

1. A method performed by a network router connecting an Internet Protocol Version 6 (IPv6) network and an Internet Protocol Version 4 (IPv4) public network for forwarding a received data packet, the method comprising:
  receiving, through a tunnel across the IPv6 network and formed between a gateway and the network router, a first IPv6 packet sent by the gateway;
  obtaining a first flow label of the first IPv6 packet, wherein the first IPv6 packet is a packet encapsulated for transmission through the tunnel and comprises a first IPv6 packet header placed before a first IPv4 packet, and the first IPv6 packet header comprises the first flow label;

decapsulating the first IPv6 packet to obtain the first IPv4 packet;

obtaining a first public IPv4 address by using the first flow label to search a correspondence relationship between internal network address information of an IPv4 private network connected by the gateway to the IPv6 network and external network address information pertaining to the IPv4 public network, wherein the internal network address information comprises: the first flow label, a tunnel identity of the tunnel, and an internal network port number; and wherein the external network address information comprises the first public IPv4 address and an external network port number;

performing network address translation on the first IPv4 packet by translating a source IP address of the first IPv4 packet from a first private IPv4 address to the first public IPv4 address; and forwarding the first IPv4 packet with the translated source IP address to the public IPv4 network.

2. The method according to claim 1, wherein the method further comprises:

receiving a second IPv4 packet sent by the IPv4 public network;

obtaining a destination IP address and a destination port number of the second IPv4 packet;

obtaining a second private IPv4 address and a second flow label, by using the destination IP address and the destination port number of the second IPv4 packet to search the correspondence relationship between the internal network address information and the external network address information;

performing network address translation on the second IPv4 packet to translate the destination IP address from a second public IPv4 address to the second private IPv4 address;

performing tunnel encapsulation on the second IPv4 packet by adding a second IPv6 packet header before the second IPv4 packet to generate a tunnel-encapsulated packet, wherein the second IPv6 packet header comprises the second flow label; and sending the tunnel-encapsulated packet across the IPv6 network to the gateway through the tunnel.

3. The method according to claim 1, wherein the first flow label of the first IPv6 packet comprises a virtual local area network (VLAN) identity or a point to point protocol over Ethernet (PPPOE) session identity, and a link identity of a customer premise equipment comprises one or more of: a slot number of an access device, a port number, or an identity of a tunnel between the customer premise equipment and the gateway.

4. A method performed by a gateway connecting an Internet Protocol Version 4 (IPv4) private network and an Internet Protocol Version 6 (IPv6) network for forwarding a received data packet, the method comprising:

receiving a first IPv4 packet sent by a first customer premise equipment in the IPv4 private network, and obtaining a link identity of the first customer premise equipment;

obtaining, according to the link identity of the first customer premise equipment that sends the first IPv4 packet, a first flow label of a first IPv6 packet through a one-to-one correspondence relationship between the first flow label of the first IPv6 packet and the link identity of the first customer premise equipment; and performing tunnel encapsulation on the first IPv4 packet by adding a first IPv6 packet header before the first IPv4 packet to generate a tunnel-encapsulated packet, wherein the first IPv6 packet header includes the first flow label, and sending the tunnel-encapsulated packet to an address family transition router through a tunnel across the IPv6 network and formed between the gateway and the address family transition router.

5. The method according to claim 4, wherein the method further comprises:

receiving, through the tunnel, a second IPv6 packet sent by the address family transition router and obtaining a second flow label of the second IPv6 packet;

performing tunnel decapsulation on the second IPv6 packet to obtain a second IPv4 packet;

obtaining, according to the second flow label, a link identity of a second customer premise equipment through the one-to-one correspondence relationship between the second flow label of the second IPv6 packet and the link identity of the second customer premise equipment; and forwarding the second IPv4 packet according to the link identity of the second customer premise equipment.

6. A device connecting an Internet Protocol Version 6 (IPv6) network and an Internet Protocol Version 4 (IPv4) public network for forwarding a packet, comprising:

a processor and a memory storing instructions, the processor being configured to execute the instructions to perform operations of:

receiving, through a tunnel across the IPv6 network and formed between a gateway and the device, a first IPv6 packet sent by the gateway, and obtaining a first flow label of the first IPv6 packet, wherein the first IPv6 packet is a packet encapsulated for transmission through the tunnel and comprises a first IPv6 packet header placed before a first IPv4 packet, and the first IPv6 packet header comprises the first flow label;

decapsulating the first IPv6 packet to obtain the first IPv4 packet;

obtaining a first public IPv4 address, by using the first flow label to search a correspondence relationship between internal network address information of an IPv4 private network connected by the gateway to the IPv6 network and external network address information pertaining to the IPv4 public network, wherein the internal network address information comprises: the first flow label, a tunnel identity of the tunnel, and an internal network port number; and wherein the external network address information comprises the first public IPv4 address and an external network port number;

performing network address translation on the first IPv4 packet by translating a source IP address of the first IPv4 packet from a first private IPv4 address to the first public IPv4 address; and forwarding the first IPv4 packet with the translated source IP address to the public IPv4 network.

7. The device according to claim 6, wherein the processor further performs:

receiving a second IPv4 packet sent by the IPv4 public network and obtaining a destination IP address and a destination port number of the second IPv4 packet;

obtaining a second private IPv4 address and a second flow label, by using the destination IP address and the destination port number of the second IPv4 packet to search the correspondence relationship between the internal network address information and the external network address information;

performing network address translation on the second IPv4 packet to translate the destination IP address from a second public IPv4 address to the second private IPv4 address;

performing tunnel encapsulation on the second IPv4 packet by adding a second IPv6 packet header before the second IPv4 packet to generate a tunnel-encapsulated packet, wherein the second IPv6 packet header comprises the second flow label; and sending the tunnel-encapsulated packet across the IPv6 network to the gateway through the tunnel.

8. The device according to claim 6, wherein the first flow label of the first IPv6 packet comprises a virtual local area network (VLAN) identity or a point to point protocol over Ethernet (PPPOE) session identity, and a link identity of a customer premise equipment comprises one kind of or a combination of multiple kinds of the following information: a slot number of an access device, a port number, an identity of a tunnel between the customer premise equipment and the gateway.

9. A device connecting an Internet Protocol Version 4 (IPv4) private network and an Internet Protocol Version 6 (IPv6) network for forwarding a packet, comprising:

a processor and a memory storing instructions, the processor being configured to execute the instructions to perform operations of:

receiving a first IPv4 packet sent by a first customer premise equipment in the IPv4 private network, and obtaining a link identity of the first customer premise equipment;

obtaining, according to the link identity of the first customer premise equipment that sends the first IPv4 packet, a first flow label of a first IPv6 packet through a one-to-one correspondence relationship between the first flow label of the first IPv6 packet and the link identity of the first customer premise equipment;

performing tunnel encapsulation on the first IPv4 packet by adding a first IPv6 packet header before the first IPv4 packet to generate a tunnel-encapsulated packet, wherein the first IPv6 packet header includes the first flow label; and sending the tunnel-encapsulated packet to an address family transition router through a tunnel across the IPv6 network and formed between the device and the address family transition router.

10. The device according to claim 9, wherein the processor further performs:

receive an receiving, through the tunnel, a second IPv6 packet sent by the address family transition router and obtaining a second flow label of the second IPv6 packet;

performing tunnel decapsulation on the second IPv6 packet to obtain a second IPv4 packet;

obtaining, according to the second flow label, a link identity of a second customer premise equipment through the one-to-one correspondence relationship between the second flow label of the second IPv6 packet and the link identity of the second customer premise equipment; and forward forwarding the second IPv4 packet according to the link identity of the second customer premise equipment.

11. A system for forwarding a packet, wherein the system comprises:

a gateway connecting an Internet Protocol Version 4 (IPv4) private network and an Internet Protocol Version 6 (IPv6) network, and an address family transition router connecting the IPv6 network and an Internet Protocol Version 4 (IPv4) public network; wherein, the gateway being configured to:

receive an IPv4 packet sent by a customer premise equipment in the IPv4 private network; obtain a link identity of the customer premise equipment;

obtain, according to the link identity of the customer premise equipment, a flow label of an IPv6 packet through a one-to-one correspondence relationship between the flow label of the IPv6 packet and the link identity of the customer premise equipment;

perform tunnel encapsulation on the IPv4 packet by adding an IPv6 packet header before the IPv4 packet to generate a tunnel-encapsulated packet, wherein the IPv6 packet header includes the flow label of the IPv6 packet; and send the tunnel-encapsulated packet to an address family transition router through a tunnel across the IPv6 network and formed between the gateway and the address family transition router; and the address family transition router being configured to:

receive, through the tunnel an IPv6 packet sent by the gateway, wherein the IPv6 packet is the tunnel-encapsulated packet;

obtain the flow label of the IPv6 packet;

decapsulate the IPv6 packet to obtain the IPv4 packet;

obtain a public IPv4 address, by using the flow label of the IPv6 packet to search a correspondence relationship between internal network address information of the IPv4 private network and external network address information pertaining to the IPv4 public network, wherein the internal network address information comprises: the flow label, a tunnel identity of the tunnel between the gateway and the address family transition router, and an internal network port number; and wherein the external network address information comprises the public IPv4 address and an external network port number;

perform network address translation on the IPv4 packet by translating a source IP address of the IPv4 packet from a first private IPv4 address to the public IPv4 address; and forward the IPv4 packet with the translated source IP address to the public IPv4 network.

* * * * *